April 6, 1965  W. J. ALEXANDER  3,177,000
COLLAPSIBLE HAND TRUCK

Filed April 1, 1963  3 Sheets-Sheet 1

INVENTOR.
WILLIAM J. ALEXANDER
BY
Mellin and Hanscom
ATTORNEYS

April 6, 1965

W. J. ALEXANDER 3,177,000

COLLAPSIBLE HAND TRUCK

Filed April 1, 1963

INVENTOR.
WILLIAM J. ALEXANDER
BY
Mellin and Hanscom
ATTORNEYS

April 6, 1965  W. J. ALEXANDER  3,177,000
COLLAPSIBLE HAND TRUCK
Filed April 1, 1963  3 Sheets-Sheet 3
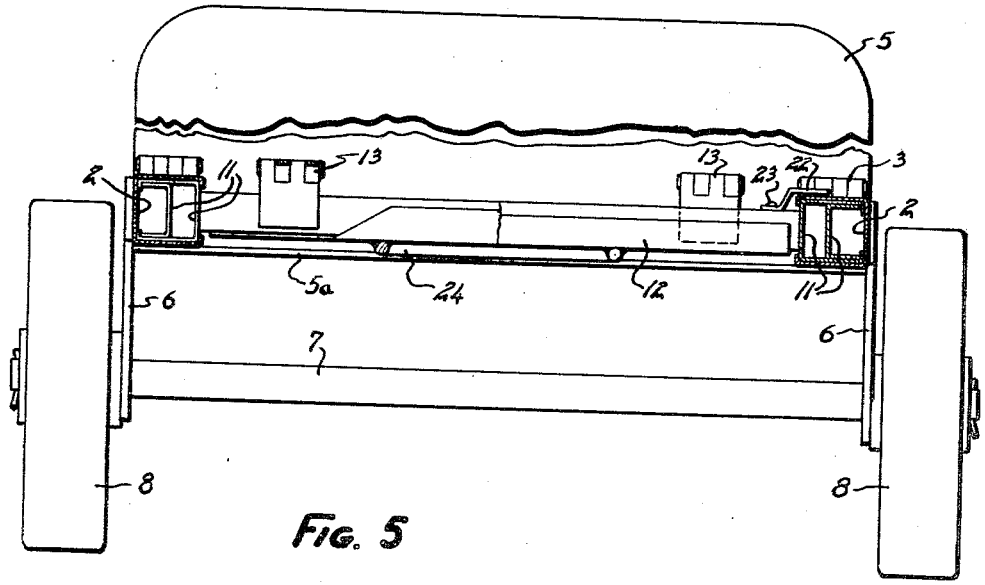
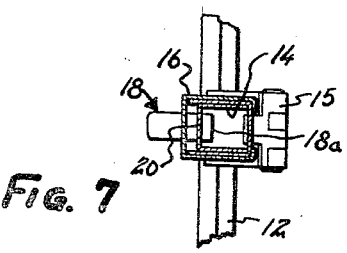
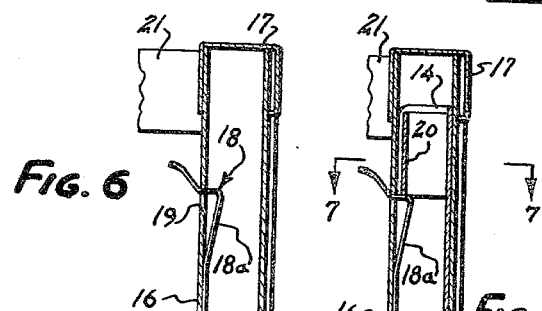
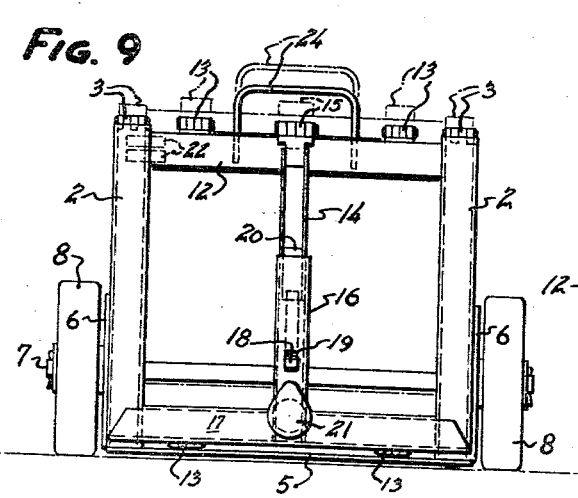
INVENTOR.
WILLIAM J. ALEXANDER
BY
Mellin and Hanscom
ATTORNEYS

* United States Patent Office *

3,177,000
Patented Apr. 6, 1965

3,177,000
COLLAPSIBLE HAND TRUCK
William J. Alexander, 19966 Alana Road,
Castro Valley, Calif.
Filed Apr. 1, 1963, Ser. No. 269,608
7 Claims. (Cl. 280—36)

This invention relates to hand trucks and more particularly to a type of hand truck which is capable of being collapsed for transportation, shipping or storage.

Collapsible hand trucks are generally known in the prior art devices, notably one of my prior inventions which is described in United States Patent No. 2,490,189. Similar to the teaching of that patent, this invention provides an articulated support comprising a plurality of side support members which are alternatively positionable in either substantial endwise alignment or in accordion fold. When the support members are positioned in endwise alignment, a plurality of bridging elements may be moved between the joints of the members, thereby changing the collapsible frame into a rigid elongated carrier.

However, unlike other collapsible trucks, this invention provides a new and inventive arrangement of bridging elements which produces distinct improvements in operation; it is more easily carried in a collapsed position; it has greater ease of assembly and is more durably constructed; the bridging elements may be quickly removed from the support members for purposes of repair or shipping; the truck is automatically latched as the bridging elements are moved to positions between joints of the articulated support; and handle members are uniquely disposed, being accessible when the hand truck is accordion folded but disposed in a plane parallel with the support when the truck has been fully erected.

A principal object of the invention is to provide improvements in a collapsible hand truck which will enhance its utility.

A second object is to provide a collapsible truck which has its bridging elements formed in a plurality of frames which impart strength and rigidity to the assembled truck carrier.

Another object of the invention is to provide a hand truck of the kind described, and further having a latch mechanism for retaining bridging elements between joints of an articulated support, said latch mechanism being self-actuating.

An additional object is to provide a hand truck of the kind described, and having handle members which are accessible when the truck is folded but disposed in a non-obstructing plane when the truck is erected.

Other objects of this invention will become apparent in view of the following detailed description and the accompanying drawings, In the drawings forming a part of this application and in which like parts are identified by like reference numerals throughout the same, FIG. 1 is a side elevation of my collapsible truck showing the manner of articulation in its assembly;

FIG. 5 is an enlarged horizontal section taken on lines 5—5 of FIG. 3;

FIGS. 6 and 6a are enlarged longitudinal sections taken on lines 6—6 of FIG. 3, and showing two positions of the locking frame;

FIG. 7 is a horizontal section taken on lines 7—7 of FIG. 6a;

FIG. 9 is a front elevation of the truck in its collapsed accordion fold position.

Figure 8:
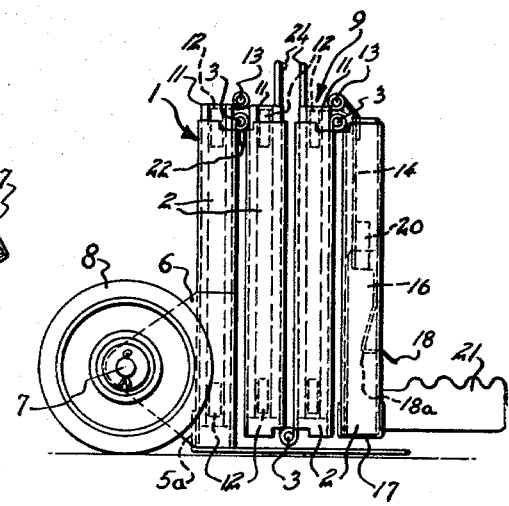
FIG. 8 is a side elevation of the truck in its collapsed accordion fold position, but having the bridging elements of the locking frame vertically extended to a stop member that prevents the frame sections from being removed.

The collapsible truck illustrated in by drawings is comprised of a main articulate support 1 having parallel pairs of side support members 2 pivotally connected one pair to another by pairs of hinge members 3. The side support members are formed from steel channels and are positionable either in an end-to-end supporting position, or in an accordion-fold collapsed position. The lowermost pair of support members have a forwardly projecting apron 5 welded or otherwise attached thereto, said apron including an integrally formed angle plate 5a. A pair of axle brackets 6 are welded to the rear of the lowermost side members and an axle 7 with wheels 8 is mounted in such manner that the wheel peripheries are substantially tangent to the plane of the forwardly projecting apron.

Figure 1:
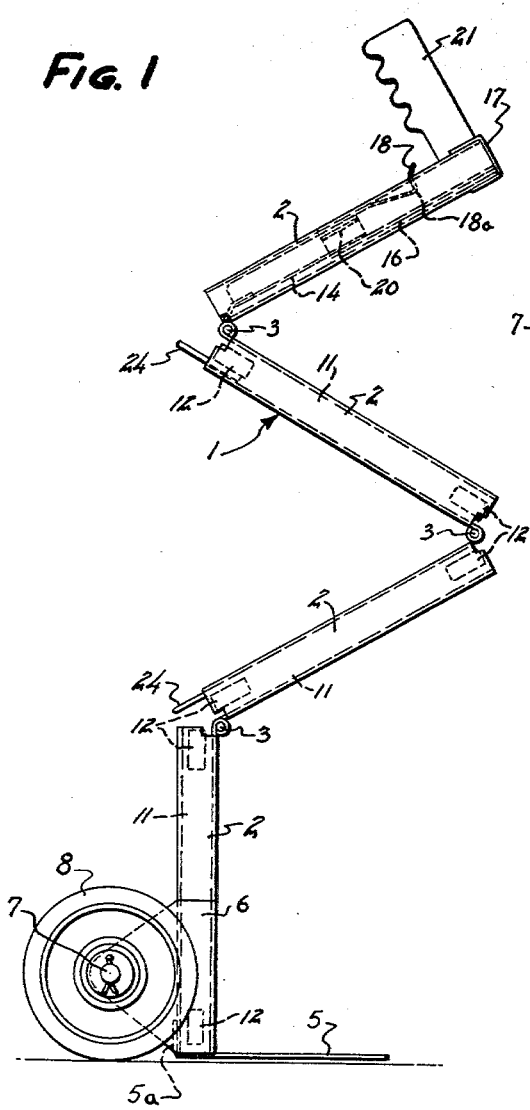
Figure 2:
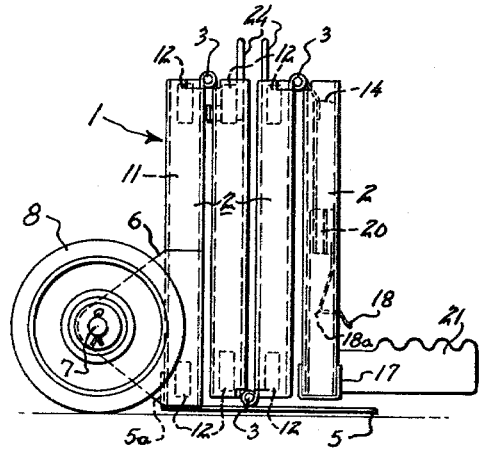
FIG. 2 is a side view of the truck in its collapsed accordion fold position.
Figure 4:
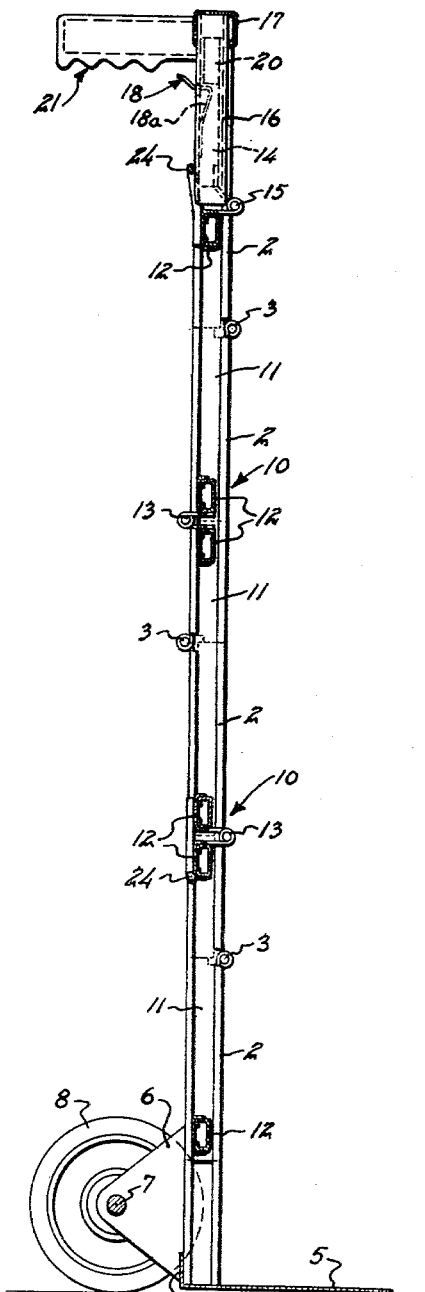
FIG. 4 is a longitudinal section of the truck disclosed in FIG. 3 taken on lines 4—4.
Figure 3:
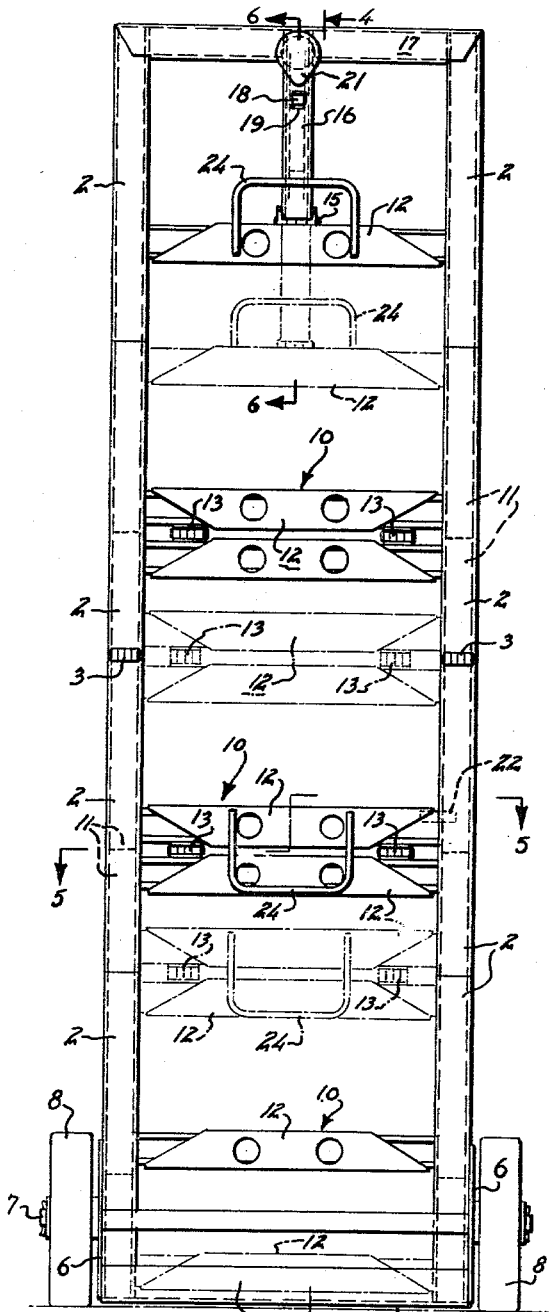
FIG. 3 is a front elevation of the truck in its unfolded or fully erected condition.

Hinge members 3 are welded to the ends of the side members, each hinge in a link chain of side support members being alternately secured to the front or to the rear of the truck, as shown in FIGS. 1, 3 and 4. This construction permits the frames to be accordion folded to a collapsed position. Since the lowermost hinge members are disposed on the forward side of their repective side members, the entire series of support members will collapse forwardly onto the apron, as shown in FIG. 2.

Reciprocally mounted within channel support members 2 is a locking frame 9 comprising a plurality of hinge-connected frame sections 10. Each frame section is formed with a pair of side bridging elements 11 and horizontal connecting elements 12, and each of the elements is made from steel channels. The channel material from which the elements 11 are constructed is slightly smaller than the size of channel material used for support members 2 so that the bridging elements are slidable within the support members but are closely confined within the sides of the larger channel pieces.

Frame sections 10 are pivotally connected one to another by second pairs of coaxial hinge members 13. Hinge members 13 are welded to top and bottom horizontal connecting elements 12, and the axis of each pair of hinges are displaced alternately to the front or to the rear sides of the frame sections, thereby permitting the frame sections to be accordion folded. The distance between adjacent pairs of hinge members 13 is such that they may be simultaneously positioned in coaxial relationship with a coaxial pair of first hinge members 3. Thus, if locking frame 9 is positioned within the extended main support 1 such that second hinge members 13 are coaxial, respectively, with first hinge members 3 (as shown in FIG. 1), then both structures may be collapsed simultaneously into an accordion fold, as shown in FIG. 2.

If the main support 1 and locking frame 9 are unfolded by pivoting the respective side members and frame sections into endwise position, and if the locking frame is moved upward as shown in FIGS. 3-4, the collapsible truck is formed into a rigid carrier. Bridging elements 11 will then be positioned across the pivot axes of hinge members 3. The locking frame may be moved relative to support frame 1 by applying an upward force to the bottom side of the uppermost connecting member 12.

A self-actuated latching means is provided for retaining locking frame 9 with its bridging elements 11 positioned across the axes of hinges 3. Referring to FIGS. 6 and 6a, a channel member 14 is pivotally connected at one end to the uppermost connecting element 12 by a hinge 15. The other end of the channel member is slidably received in a channel guide 16, said guide being mounted to a cross member 17 that interconnects the upper ends of the uppermost pair of side support members 2. A spring latch finger 18 is welded at one end within guide 16. The other end thereof projects through an opening 19 formed in the guide and being accessible for manual operation.

Channel member 14 supports a small channel piece 20 which is welded onto the upper end of said member; and as the locking frame 9 is being moved into bridging relationship with main frame 1, the lip of channel piece 20 makes contact with an inclined surface 18a of finger 18, causing the finger to spring outwardly and down until the lip passes the finger and into the position shown in FIG. 6a. Finger 18 will then spring back, locking shaft 14 in a raised position while frame 9 occupies its bridging position relative to hinges 3 of main frame 1. Thus, frame 9 will be retained in a bridging position until such time that finger 18 is manually depressed, allowing the lip of channel piece 20 to be moved downwardly.

For ease of operating finger 18 while simultaneously supporting the hand truck with one hand, a handle 21 is mounted to cross member 17 in close proximity to the finger 18. An erected hand truck may then be conditioned for folding by merely holding the truck by its handle 21, depressing finger 18 by the index finger of the same hand, and stepping upon the lowermost connecting element 12 of frame 9.

Referring now to FIG. 2, it will be noted that if the main support 1 and locking frame 9 are placed in their accordion fold positions the bridging elements of the latter may be vertically mated with the side members of the former. The apron 5 and cross member 17 do not then obstruct such an insertion. Once the bridging elements have been slid into their respective channel side support members 2, a stop means 22 is attached to one or more of the horizontal connecting members 12. This stop means coacts with a hinge 3 that connects side support members 2, as shown in FIGS. 8 and 9, thereby obstructing free movement of the bridging elements. The stop means are preferably located at a distance from the cooperating hinge to permit a limited movement of the locking frame to such a degree that the pairs of second hinge elements 13 can be axially displaced from respective first hinge members 3. In such a position neither the main support 1 nor the mated locking frame 9 can be unfolded since neither the bridging elements nor the side support members can pivot at their respective hinges 3 and 13.

It will be further noted that the stop means 22 imposes no restriction upon the movement of bridging elements if they are first unfolded, since the movement of the stop means is then in the opposite direction to its cooperating hinge 3. Therefore, before the stop means reaches the hinge the locking frame has already been fully extended to its locking position, as shown in FIG. 3.

FIG. 5 of the drawings is an enlarged view taken on lines 5—5 of FIG. 3, showing the stop means to comprise an angle bracket which has been secured to a connecting member by screws 23. The free end of the bracket, it will be noted, is adapted to engage a hinge 3 when frame 9 is moved relative to main frame 1.

A pair of handle members 24 are welded to horizontal connecting elements of the locking frame. As shown in FIGS. 2, 8 and 9, the handles are accessible from above the accordion folded bridging elements 11 and support members 2, and it provides a means to lock the collapsible truck in a folded state while being carried. As the hand truck is unfolded, however, the handles are pivoted into a position beneath the support structure, as shown in FIGS. 1, 3 and 4.

The manner of operation is as follows: to make the collapsed truck into a rigid carrier, the main support 1 and locking frame 9 are first unfolded into a distended position; then, by lifting up on a horizontal element 12 the bridging elements 11 of the locking frame are moved between the joints of the side supporting members 2. Finger 18 will spring outwardly as the lip of channel piece 20 passes across surface 18a, but will return automatically to a position behind the lip as soon as the bridging elements 11 have been moved sufficiently between the joints of hinges 3, thereby locking the hand truck into a rigid carrier.

It is evident that changes may be made in the form and arrangement of the several parts above described without departing from the spirit and scope of my invention; hence, I do not wish to be limited except as may be specifically set forth in the appended claims.

Having thus described my invention, what I claim and desire to secure by Letters Patent is:

1. A collapsible hand truck comprising a main articulate support having a plurality of side support members pivotally connected one to another by first hinge members and positionable in substantial endwise alignment; a locking articulate support having a plurality of frame sections including longitudinally unconnected side bridging elements slidably mounted in said side support members, said side bridging elements being connected by connecting elements pivotally connected one to another by second hinge members, said second hinge members being simultaneously positionable in axial alignment with respective first hinge members; said support members and frame sections being accordion collapsible when said first and second hinge members are respectively aligned; and self-actuating latch means for holding said bridging elements in a bridging position relative to support members.

2. The collapsible hand truck of claim 1 wherein said self-actuating latch means comprises a spring finger mounted to said main articulate support, said finger having an inclined contact surface extending substantially in the plane of said support members; and a contact lip mounted to said locking articulate support.

3. The collapsible hand truck of claim 2 and further including a handle mounted to the upper portion of said main articulate support and disposed proximate to said spring finger.

4. A collapsible hand truck comprising a main articulate support having a plurality of support members connected one to another by first hinge members and positionable in substantial endwise alignment; a locking articulate support having a plurality of bridging elements pivotally connected one to another by second hinge members and slidably mounted in said support members, said second hinge members being simultaneously positionable in axial alignment with respective first hinge members, whereby said support members and bridging elements may be simultaneously folded; and stop means limiting slidable movement of said bridging elements in said support members when folded but permitting said second hinge members to be axially displaced from respective first hinge members, whereby the misalignment of said hinges prevents said support members and bridging elements from unfolding.

5. A collapsible hand truck comprising a main articulate support having a plurality of support members connected one to another by first hinge members and positionable in substantial endwise alignment; a locking articulate support having a plurality of bridging elements connected one to another by second hinge members and slidably mounted in said support members, said second hinge members being simultaneously positionable in axial alignment with respective first hinge members, whereby said support members and bridging elements may be simultaneously folded; means including a handle member connected to a bridging element for moving said bridging elements longitudinally relative to said support members; and stop means limiting slidable movement of said bridging elements in said support members when folded and lifted by said handle, but permitting sufficient movement for axial displacement of said second hinge members from respective first hinge members, whereby the misalignment of said hinges prevents said support members and bridging elements from unfolding.

6. A collapsible hand truck comprising a plurality of side support members pivotally connected one to another by first hinge members and positionable in substantial endwise alignment, the lowermost support members having a forwardly extending apron secured thereto and ground engaging wheels rotatably supported thereon, said other support members being accordion collapsible over said forwardly extending apron such that each frame section is substantially normal to the plane of said apron; a locking articulate support having a plurality of frame sections pivotally connected one to another by second hinge members, said frame sections having side bridging elements slidably mounted in said side support members, said second hinge members being simultaneously positionable in axial alignment with respective first hinge members, whereby said side support members and bridging elements may be accordion folded together; a pair of handle members each connected to a frame section and accessible from above the accordion folded elements and members, one handle member extending upward from the upper side of one frame section and the other handle member extending downward from the lower side of an adjacent frame section; a stop means permitting limited slidable movement of said bridging elements in said side members when accordion folded until said second hinge members are axially displaced from respective first hinge members, whereby the misalignment of said hinges prevents said side members from unfolding.

7. A collapsible hand truck comprising pairs of side support members pivotally connected one to another by first hinge members and positionable in substantial endwise alignment, the lowermost pair of support members having a forwardly extending apron secured thereto and ground engaging wheels rotatably supported thereon, said other pairs of support members being accordion collapsible over said forwardly extending apron such that each frame section is substantially normal to the plane of said apron; pairs of bridging elements pivotally connected one to another by second hinge members, said pairs of bridging elements being slidably mounted in respective pairs of side members and said second hinge members being simultaneously positionable in axial alignment with respective first hinge members, whereby said side support members and bridging elements may be accordion folded together; means including a pair of handle members each disposed in the plane of said frame sections and permanently connected to a pair of bridging elements and accessible from above the accordion folded elements and members, one handle member extending upward relative to the upper ends of one pair of bridging elements and the other handle member extending downward relative to the lower ends of an adjacent pair of bridging elements.

References Cited by the Examiner
UNITED STATES PATENTS 2,490,189   12/49   Alexander _____ 280—36

ARTHUR L. LA POINT, *Primary Examiner.*